(12) United States Patent
Nayak et al.

(10) Patent No.: US 8,539,866 B2
(45) Date of Patent: Sep. 24, 2013

(54) METHOD AND APPARATUS TO REMOVE CAST FROM AN INDIVIDUAL

(75) Inventors: Suresh Nayak, Cincinati, OH (US); Ronald R Watson, Placida, FL (US)

(73) Assignee: Castrax, L.L.C., Scottsdale, AZ (US)

( * ) Notice: Subject to any disclaimer, the term of this patent is extended or adjusted under 35 U.S.C. 154(b) by 28 days.

(21) Appl. No.: 13/373,890

(22) Filed: Dec. 5, 2011

(65) Prior Publication Data

US 2012/0215228 A1    Aug. 23, 2012

Related U.S. Application Data

(63) Continuation-in-part of application No. 12/799,711, filed on Apr. 30, 2010, now Pat. No. 8,069,760, which is a continuation-in-part of application No. 12/315,212, filed on Dec. 1, 2008, now Pat. No. 8,042,439.

(51) Int. Cl.
*B23D 1/00*    (2006.01)

(52) U.S. Cl.
USPC ......... 83/13; 30/290; 30/294; 30/370; 83/491

(58) Field of Classification Search
USPC ............... 83/13, 491; 602/5, 8–10; 30/370, 30/90.1, 90.6, 90.4, 289, 290, 294, 297, 314, 30/317; 606/138, 105, 105.5
See application file for complete search history.

(56) References Cited

U.S. PATENT DOCUMENTS

| | | | | |
|---|---|---|---|---|
| 2,187,175 A * | 1/1940 | Prosperi | ............................ | 602/9 |
| 2,206,339 A * | 7/1940 | Ulman, Jr. | ....................... | 602/9 |
| 2,230,781 A * | 2/1941 | Longfellow | ...................... | 602/9 |
| 2,490,878 A * | 12/1949 | Marsh | .............................. | 30/276 |
| 2,519,520 A * | 8/1950 | Waxlax | .............................. | 602/9 |
| 2,523,837 A * | 9/1950 | Luger | ................................ | 602/9 |
| 2,837,088 A * | 6/1958 | Moses | ............................ | 602/14 |
| 3,867,931 A * | 2/1975 | Babka | ................................ | 602/9 |
| 3,985,129 A * | 10/1976 | Huene | ............................... | 602/9 |
| 4,129,127 A * | 12/1978 | Ellison | ............................. | 602/12 |
| 4,625,405 A * | 12/1986 | Hudnutt et al. | ................. | 30/370 |
| 5,435,066 A * | 7/1995 | Bare et al. | ....................... | 30/388 |
| 5,944,675 A * | 8/1999 | Bequet-Sharber et al. | ........ | 602/9 |

\* cited by examiner

*Primary Examiner* — Phong Nguyen
(74) *Attorney, Agent, or Firm* — Tod R. Nissle, P.C.

(57) ABSTRACT

A method for installing a fiberglass cast on and removing the cast from an individual includes an open ended pliable thin-walled polymer guide track and cutting tool designed to track along said guide track to cut the cast and to prevent, while a cast is being removed, injury to the individual.

1 Claim, 9 Drawing Sheets

METHOD AND APPARATUS TO REMOVE CAST FROM AN INDIVIDUAL

This is a continuation-in-part of and claims priority based upon patent application Ser. No. 12/799,711 filed Apr. 30, 2010 which is a continuation-in-part and claims priority based upon patent application Ser. No. 12/315,212, filed Dec. 1, 2008.

This invention relates to casts that are temporarily placed on individual's skeletal or muscular structure. One common use of a cast is to support the leg, arm, or other part of the body.

More particularly, the invention pertains to a method and apparatus for removing such casts.

First Trend

A first trend in connection with the removal of a cast comprises placing an elongate tubular guide or channel on a portion of the body of an individual prior to applying the cast and permitting the cast to solidify. The cast, when applied, covers the tubular guide. When the time comes to remove the cast an elongate cutting wire is fed through the tubular guide. The cutting wire is moved back and forth to outwardly cut through the cast, or is otherwise forced outwardly through the cast to cut the cast. One common cutting wire is identified by the name Giggli saw.

Second Trend

A second trend in connection with the removal of a cast comprises placing an elongate tubular guide or channel on a portion of the body of an individual prior to applying the cast and permitting the cast to solidify. The cast, when applied, covers the tubular guide. When the time comes to remove the cast a scissors tool is utilized to cut through the cast. The tubular guide helps to direct the scissors.

Third Trend

A third trend in connection with the removal of a cast comprises utilizing a shield comprising an elongate relatively flat strip of material. The shield is placed on a portion of the body of an individual prior to applying the cast and permitting the cast to solidify. The cast, when applied, covers the flat strip of material. When the time comes to remove the cast with a cutting tool, the flat strip of material functions to shield the individual from a cutting tool.

Fourth Trend

A fourth trend in connection with the removal of a cast comprises utilizing a tool with a rigid foot that a user slides along a shield strip or guide channel. The tool also includes a rotary cutting tool that is situated above the fixed foot and cuts the cast. The tool utilizes a circular, flat, thin blade with teeth situated around the circular peripheral edge of the blade Fifth Trend A fifth trend in connection with the removal of a cast comprises utilizing a Stryker saw or similar tool to remove a cast. A Stryker saw includes a housing and a saw blade rotatably mounted on the housing. The saw blade is a panel-shaped, relatively thin, flat, circular blade with cutting or abrading material formed on the sides of the blade near the circular outer peripheral edge of the blade. The outer peripheral edge of the blade does not include abrading or cutting material; this to minimize the likelihood that the outer edge of the blade will cut the skin of an individual. The rapid rotation of the blade can, however, cause the outer peripheral edge to burn or cut the skin of an individual on contact. A user grasps the housing and uses the saw blade to cut through a cast while endeavoring not to contact and injure the skin of the individual. The Stryker saw can be, but often is not, utilized in connection with a protective strip or with a guide. The user simply does his or her best to guide and control the saw and to not inadvertently burn or cut the skin of an individual. Such inadvertent injury does, however, occur on a fairly regular basis. Further, the noise associated with use of the saw often effectively functions to terrify children who are having a cast removed. Such fear on the part of a child and the child's parent is magnified when a user inadvertently contacts and burns or cuts the skin of the child with the saw blade.

The Stryker saw is currently by far the presently preferred, and usually the only, method of removing a cast. The methods and tools set forth above with respect to the third trend are currently sometimes used on a limited basis in the market. However, the methods and tools set forth above in the first through the fourth trends otherwise are basically largely, if not entirely, obsolete, are currently ignored, and in the real world exist only in the print and paper comprising earlier issued patents, magazine articles, and other documents.

The Stryker saw has evidently been the preferred method of removing a cast for at least the last twenty (20) years; any perceived motivation to provide an alternate method or removing a cast has not provided sufficient impetus to displace use of the Stryker saw, or to reinstate the obsolete methodology set forth in prior issued patents or other documents.

Nonetheless, it is a principal object of the invention is to develop an improved method and apparatus to remove a cast, in particular a fiberglass cast, from an individual. A fiberglass cast is significantly more difficult to cut than was the old fashioned plaster cast.

This and other, further and more specific objects and advantages of the invention will be apparent to those skilled in the art from the following detailed description thereof, taken in conjunction with the drawings, in which.

Briefly, in accordance with the invention we provide an improved method of installing a fiberglass cast on and removing the cast from an individual. The method comprises the step of providing a track (10) with a top; a bottom; a length (L); an elongate primary guide opening (11) extending the length of the track, the opening having a width (W) and a selected shape and dimension; and, an elongate secondary guide opening (18A) extending from the primary opening upwardly to the top of the track, and having a width less than the primary opening. The method also comprises the step of providing a rotatable bit (20) including a rotatable shaft (22) and a tracking foot (21). The shaft has an outer surface shaped and dimensioned to cut through a fiberglass cast; a width less than the width of the secondary guide opening; a distal end (27); and, is shaped and dimensioned to move along the secondary opening. The tracking foot is foot (21) is attached to the distal end of the shaft; has an outer surface (25); has a width greater than the width of the shaft (22) and less than the width of the primary opening, is free of cutting surfaces, and is shaped and dimensioned to generally conform to the shape and dimension of the primary guide opening to minimize lateral movement of the foot in the primary guide opening and to permit the foot to move freely along the primary opening. The method also includes the steps of placing the track (10) on an individual; applying at a first selected time a fiberglass cast on the individual, the cast covering substantially all of the track (10); and, at a second selected time subsequent to said first time, rotating the bit and moving the foot along the primary opening and the shaft along said secondary opening such that the shaft cuts through the fiberglass cast.

In another embodiment of the invention, provided is a method of installing a fiberglass cast on and cutting the cast for removal from an individual. The method includes the steps of providing a length of a pliable hollow thin-walled guide tube (110) with a top, a bottom, a length, and open first and second ends; providing an elongate support tool (55) shaped and dimensioned to slide into and extend along the tube (110); and, providing a cutting tool. The cutting tool includes a housing; a motor unit mounted in the housing; a rotatable shaft with a proximate end mounted on the motor unit, and with a distal end having an outer cutting surface shaped and dimensioned to cut through a fiberglass cast, the shaft being rotated by the motor; and, a guide tool mounted on the housing and including a tracking foot positioned beneath the cutting surface and shaped and dimensioned to fit in and slide along the pliable guide tube. The method also includes the steps of sliding said support tool in said pliable guide tube; placing the guide tube and support tube on an individual; applying at least first layer of fiberglass along and over a portion of the guide tube excluding the first end of the guide tube; wrapping the first end of said guide tube over said first layer of fiberglass to form a loop extending around said first layer of fiberglass; applying at least a second layer of fiberglass along and over the portion of the guide tube and the first end of the guide tube to affix the first end of the guide tube between the first and second layers of fiberglass; sliding the support tool out of the guide tube; and, allowing the first and second layers of fiberglass to harden; and, at a subsequent time, cutting the loop, and manipulating the tool to insert the guide foot in the guide tube and slide the guide foot along the tube while cutting through the fiberglass layers with the outer cutting surface.

In a further embodiment of the invention, provided is an improved method of installing a fiberglass cast on and cutting the cast for removal from an individual. The improved method comprises the steps of providing a length of a pliable hollow thin-walled guide tube (110) with a top, a bottom, a length, and open first and second ends; providing an elongate support tool (55) shaped and dimensioned to slide into and extend along the tube (110); providing a cutting tool including a housing (77), a motor unit mounted in the housing, a blade (80) oscillated by the motor unit; a guide (70) including an upper leg (71) with a guide slot (72) formed therealong, and a lower leg (75) spaced apart from the upper leg, the lower leg (75) shaped and dimensioned to fit in and slide along the pliable guide tube; sliding the support tool in the pliable guide tube; placing The guide tube and support tube on an individual; applying at least first layer of fiberglass over a portion of the guide tube; applying at least a second layer of fiberglass along and over the first layer of fiberglass; sliding the support tool out of the guide tube; allowing the first and second layers of fiberglass to harden; and, at a subsequent time, inserting the lower leg of the guide (70) in the tube with the upper leg of the guide extending over the cast, and, using the blade (80) of the cutting tool to track along the guide slot (72) and cut through the first and second layers of fiberglass.

Figure 1:
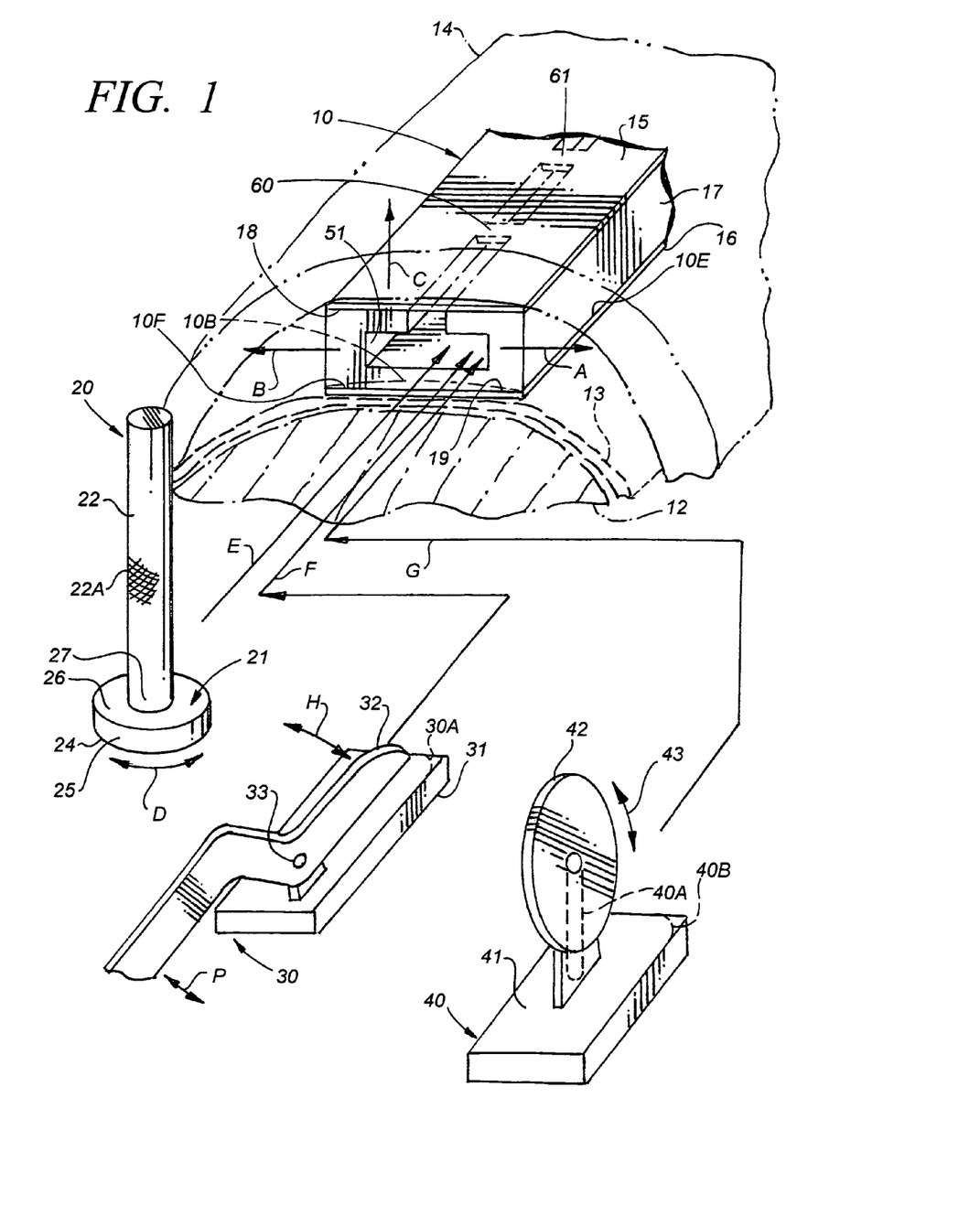
FIG. 1 is an exploded perspective view illustrating apparatus constructed in accordance with the principles of the invention and the mode of operation thereof.

Turning now to the drawings, which depict the presently preferred embodiments of the invention for the purpose of illustrating the practice thereof and not by way of limitation of the scope of the invention and in which like reference characters refer to corresponding elements throughout the several views, FIG. 1 illustrates a track generally indicated by reference character 10. Track 10 preferably is, as will be described, somewhat pliable and is not rigid. Such pliability permits the track 10 to conform to the body of an individual. Track 10 includes top 18, bottom 19, and side 17. Primary opening 11 extends along the length (L) (FIG. 3) of track 10. Primary opening 11 includes and is circumscribed by vertically oriented sides 51 and 52, horizontally oriented bottom 50, and ceiling 53. As can be seen, primary opening 11 currently preferably has a rectangular cross section. The shape and dimension of opening 11 can, however, vary as desired and have, by way of example, a triangular, trapezoidal, or spherical cross section. If desired, the bottom of track 10 can, instead of being flat, be provided with a concave contour 10B (FIGS. 1 and 3) to enable track 10 to better contour to an arm or other portion of an individual's body. Similarly, if desired, the lower parallel outer edges 10E and 1OF of track 10 can, instead of comprising straight edges, be rounded or provided with a radius as indicated by dashed line 10C and 10D in FIG. 2. The use of rounded edges 10C and 10D reduces the likelihood that edges 10E and 1OF will generate uncomfortable pressure points in the tissue of an individual.

Secondary opening 18A also extends along the length (L) of track 10, and, extends upwardly from opening 11 to the top 18 of track 10. The width of opening 18A is less than the width W of the primary opening 11 and is greater than the width S of shaft 22 of bit 20 (FIG. 1).

Figure 2:
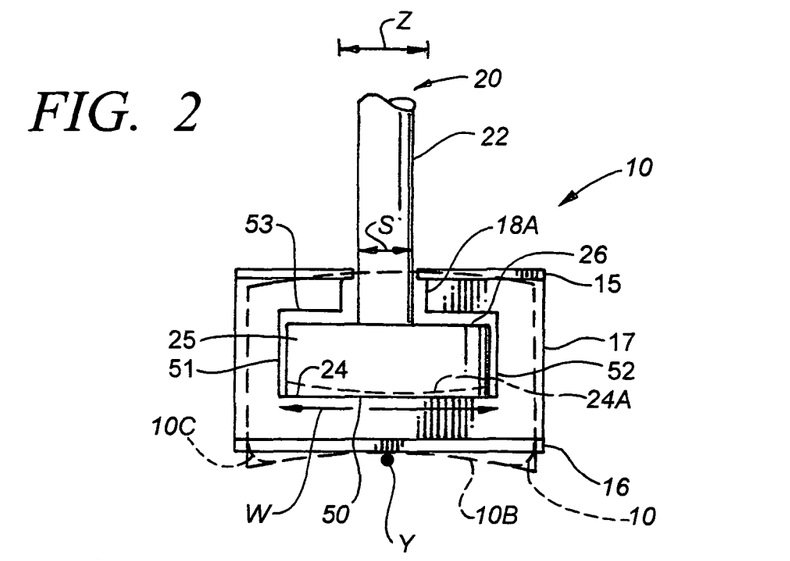
FIG. 2 is a front view further illustrating the mode of operation of one of the embodiments of the invention.

As is illustrated in FIGS. 1 and 2, an adhesive strip 16 can, if desired, be applied to track 10 and extend along the bottom 19 of track 10. Strip 16 can, if desired, be covered with a protective strip of paper or other material. The protective strip is peeled off strip 16 prior to emplacing strip 10 on an individual when a cast is being applied to the individual.

A protective strip of material 15 (FIG. 1) can, if desired, be applied to the top 18 of track 10 to cover secondary opening 18A. Strip 15 is preferred because it prevents fiberglass or other material from entering openings 18A and 11 when a cast is being formed over track 10. The strip 15 is preferably formed of a thin sheet of paper, polymer, or some other material that can readily be cut by bit 20 when foot 21 moves along the length of opening 11. In an alternate embodiment of the invention, ribs or bridge structures 60, 61 extend across strip 15 at selected spaced apart locations along the length of opening 18. Ribs 60, 61 can be utilized in place of or in conjunction with strip 15.

Figure 3:
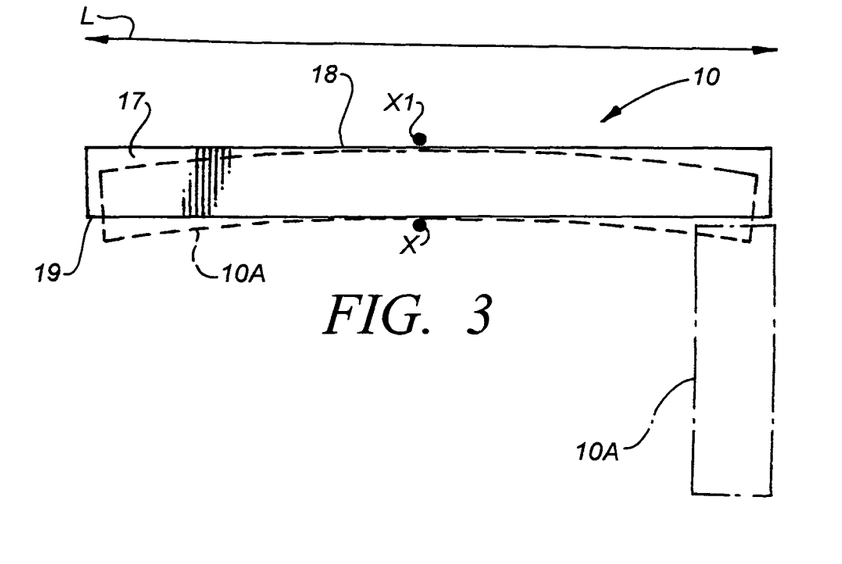
FIG. 3 is a side elevation view illustrating the mode of operation of a track utilized in the practice of the invention.

Track 10 preferably is somewhat pliable along its length such that track 10 will bend downwardly longitudinally in the manner indicated by dashed lines 10A about an axis X (of upwardly about on axis X1) that in FIG. 3 is perpendicular to the plane of the sheet of paper of the drawing. This permit track 10 to conform to the body of an individual. On the other hand, it is preferred to limit the ability of track 10 to bend transversely about an axis Y that in FIG. 3 is perpendicular to the plane of the sheet of paper of the drawing. In other word, track 10 is transversely substantially rigid. Transverse rigidity is important because it significantly reduces the likelihood that track 10 will transversely bend and then bind foot 21 as it moves along track 10.

Bit 20 includes cutting shaft 22 and foot 21 fixedly attached to the distal end 27 of shaft 22. The outer surface 22A of shaft 22 is serrated or otherwise shaped and dimensioned and configure to cut through strip 15 and ribs 60 and 61 when bit 20 rotates about the longitudinal axis of bit 20. Proximate, or upper, end of shaft 22 is engaged by a drill chuck (not shown) or other apparatus that rotates bit 20. Foot 21 includes upper surface 26, bottom surface 24, and peripheral cylindrically shaped outer surface 25. Bottom surface 24 can, as indicated by dashed line 24A in FIG. 2, have a convex shape to facilitate movement of foot 21 along primary opening 11. Foot 21 is shaped and dimensioned generally to fit in, conform to, and move along primary opening 11. In this manner, when foot 21 is slid or otherwise moved along the length of opening 11, opening 11 restricts lateral movement of foot 21 in the directions of arrows A and B and restricts vertical movement of foot 21 upwardly in the direction of arrow C (FIG. 1). Primary opening in essence functions to "capture" foot while permitting foot 21 to be freely moved along the length of opening 11 while bit 20 is rotating. The rounded cylindrical outer surface 25 of bit 20 provides a minimal contact area in the event foot 21 bears against a side 51, 52. Bottom surface 24 readily rotates over bottom 50 of opening 11. Bottom surface 24 of foot 21 preferably, but not necessarily, has a convex shape to minimize the area of surface 24 that is contact with bottom 50 at any given time.

Rectangular foot 40 (FIG. 1) is, in a manner similar to foot 21, shaped and dimensioned to fit in and freely slide along opening 11. A saw blade 42 is mounted on the top 41 of foot 40 to rotate in a selected one of the directions indicated by arrows 43. A motor or other motive power (not shown) is provided to turn blade 42 such that it cuts through a fiberglass cast while foot 40 travels along the length of opening 11.

Rectangular foot 30 (FIG. 1) is, in a manner similar to feet 21 and 40, shaped and dimensioned to fit in and freely slide along opening 11. A scissor jaw 32 is pivotally 33 mounted on foot 30 and pivotally reciprocated in the manner indicated by arrows H to cut through a fiberglass cast while foot 30 travel along the length of opening 11.

In use, a strip of soft cast padding/stockingette material is wrapped 13 (FIG. 1) around an arm, leg, or other body area on which a cast is to be mounted. The protective paper or polymer strip (not shown) covering adhesive layer 16 is removed, and track 10 is placed on the arm generally parallel to the longitudinal axis of the arm. Adhesive layer 16 secures track 10 to the layer of cotton lining material, (or to a layer(s) of another material or to the skin if such a layer is not utilized. A fiberglass cast 14 is then applied around the arm and is allowed to harden. The fiberglass cast 14 covers substantially the entire length of track 10 except, however, the ends of track 10 are left exposed, or accessible, to facilitate the use of bit 20. At some subsequent time, the cast needs to be removed. At that time, bit 20 is rotated, and foot 21 is moved into one end of primary opening 11 in the manner illustrated in FIG. 2 and is moved along the entire length of opening 11 to cut the fiberglass cast. When foot 21 moves into opening 11, shaft 22 extends upwardly through secondary opening 18A and simultaneously cuts through strip 15 and the portion of cast 14 positioned directly above secondary opening 18A. A portion of rotating shaft 22 moves along secondary opening 18A (FIG. 2) simultaneously with the movement of foot 21 along primary opening 11.

Figure 4:
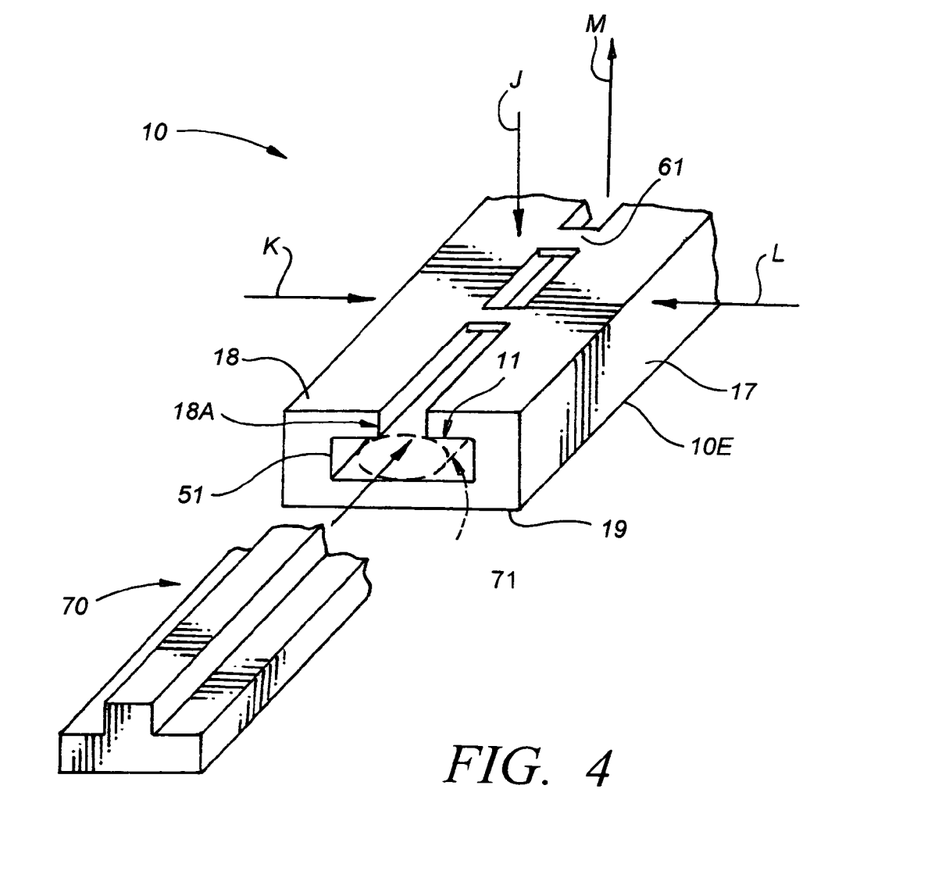
FIG. 4 is an exploded perspective view illustrating apparatus constructed in accordance with the principles of the invention and illustrating a removable insert utilized to strengthen the apparatus during the application of a cast to an individual.

In one preferred embodiment of the invention, when bit 20 is rotated and foot 21 is moved along opening 11 to cut through cast 14, bit 20 is pulled upwardly in the direction of arrow M (FIG. 4). The magnitude of the force generated in the direction of arrow M can vary as desired, but ordinarily is relatively small and, in contrast to a Stryker saw, is sufficient to insure that track 10 is not downwardly pressed against the body of the individual while bit 20 cuts through cast 14. If the magnitude of force M is too great, the friction forces generated when rotating foot 21 bears against ceiling 53 can unnecessarily impede the ready movement of foot 21 along opening 11.

FIG. 1 illustrates only a single track 10 on the arm of an individual. As would be appreciated by those of skill in the art, cast 14 ordinarily needs to cut along two opposing sides to be removed. Accordingly, a second track (not visible in FIG. 1) is placed on layer 13 on the opposite side of the arm at the same time track 10 is placed on layer 13. When cast 14 is applied, it covers both tracks. In other words, the procedure for installing the second track is equivalent to that for installing track 10. When the time comes to remove a fiberglass cast 14, rotating bit 20 is moved along track 10 to make one cut through cast 14, and is then moved along the second track to make a second cut through cast 14. The two cuts function to halve the cast to permit ready removal of the cast from the individual's arm.

A length of track 10 can be wound and stored on a roll such that a desired length of track 10 can be pulled off the roll and cut from the roll, much like rope is stored on a large roll and desired lengths of rope are measured and cut from the rope remaining on the roll.

In some instances, a cast 14 made from fiberglass or an equivalent material is applied to portions of an individual's body that are at an angle to one another. For example, in some cases it is desirable to maintain the lower arm generally perpendicular to the upper arm. In this instance, two lengths 10, 10A (FIG. 3) of track can be utilized. One length is along the lower arm. The other length is along the upper arm. In FIG. 3, adjacent ends of tracks 10, 10A generally co-terminate. If desired, however, one adjacent end can extend past the other adjacent end. If after bit 20 is utilized, a portion of a cast remains uncut, then the scissors-like cutting apparatus 30, 32 of FIG. 1 (or another other desired apparatus) can be utilized to finished cutting the cast.

In FIG. 1, foot 31 of tool 30 is shaped and dimensioned generally to fit in, conform to, and move along primary opening 11. In this manner, when foot 31 is slid or otherwise moved along the length of opening 11, opening 11 restricts lateral movement of foot 31 in the directions of arrows A and B and restricts vertical movement of foot 31 upwardly in the direction of arrow C (FIG. 1). Primary opening 11 and foot 31 function in combination to "capture" and restrict the movement of foot 31 while permitting foot 31 to be freely moved along the length of opening 11 while scissors jaw 32 is manipulated about pivot pin 33 in the directions indicated by arrows P in order to cut a cast. If desired, a lower jaw can be provided which also pivots about pin 33 and opposes jaw 32 in the manner that a pair of conventional scissors have a pair of opposing jaws pivoting about a common point.

In FIG. 1, foot 41 of tool 40 is shaped and dimensioned generally to fit in, conform to, and move along primary opening 11. In this manner, when foot 41 is slid or otherwise moved along the length of opening 11, opening 11 restricts lateral movement of foot 41 in the directions of arrows A and B and restricts vertical movement of foot 41 upwardly in the direction of arrow C (FIG. 1). Primary opening 11 and foot 14 function in combination to "capture" foot 41 while permitting foot 41 to be freely moved along the length of opening 11 while saw blade 42 rotates in one of the directions indicated by arrows 43. A slot 40A can be formed in tool 40 so that blade 42 can travel up and down in slot 40A while the blade 42 is cutting the a fiberglass cast 14.

In FIG. 4, insert 70 is shaped and dimensioned to generally conform to and to be slidably inserted simultaneously into primary opening 11 and secondary opening 18A. When track 10 is placed on a part of an individual's body and a fiberglass cast 14 is wrapped around track 10, forces acting in the direction of arrows J, K, and L are generated, act against, and tend to deform track 10. Insert 70 functions to maintain the shape and dimension of track 10 and, in particular, of openings 11 and 18A. Maintaining the shape of openings 11 and 18A is important because foot 21 and shaft 22 must freely move along openings 11 and 18A, respectively, when bit 20 is utilized to cut through and remove cast 14. An insert that provides support for track 10 need not have the "inverted T" shape of insert 70 or conform closely to the shape and dimension of openings 11 and 18A. An insert 71 with an oval or circular or other cross-sectional area can function, when inserted in track 10, to provide support and prevent or minimize the deformation of track 10 when forces J, K, or L are applied to track 10. As is illustrated in FIG. 3, track 10 can, if desired, be somewhat pliable along its length such that track 10 will bend downwardly (or upwardly) longitudinally. An insert 70, 71 can similarly be somewhat pliable and bend downwardly (or upwardly) along its longitudinal axis such that track 10 and an insert 70, 71 can—when insert 70, 71 is slidably inserted in openings 11 and/or 18A and extends along (either partially or completely) the length of track 10—bend simultaneously along their longitudinal axes.

An alternate embodiment of the invention is illustrated in FIGS. 5 to 9.

Figures 5, 6:
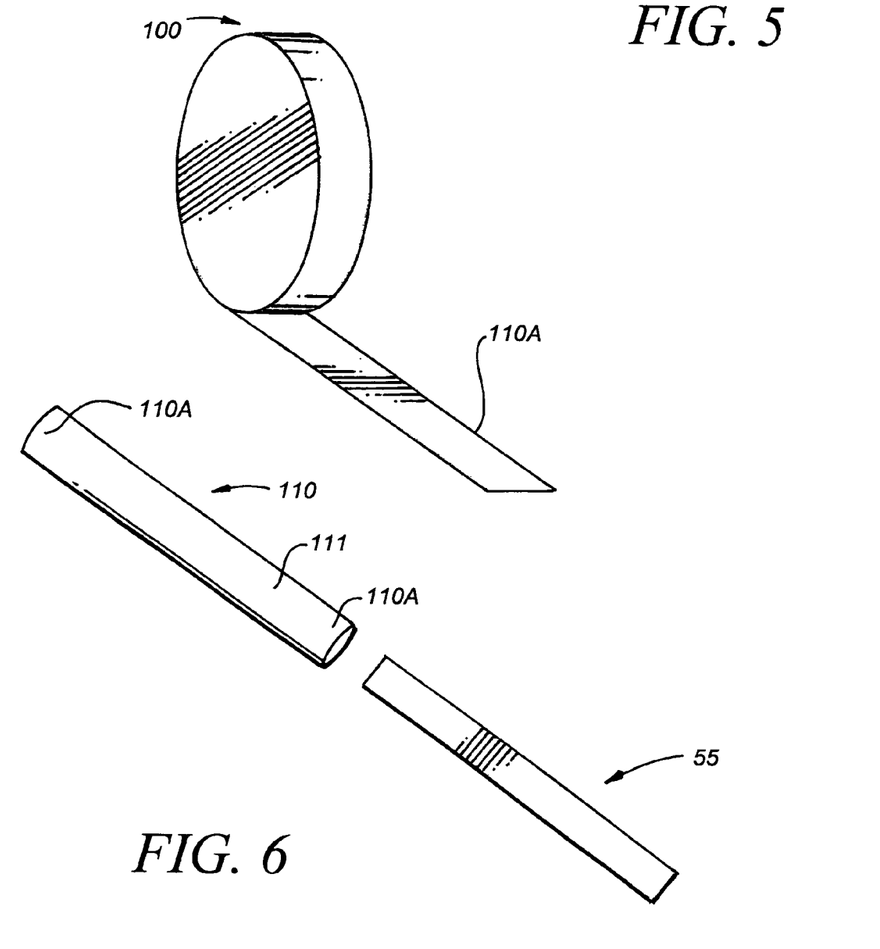
FIG. 5 is a perspective view illustrating a roll of pliable hollow tape utilized in an alternate embodiment of the invention.
FIG. 6 is a perspective view illustrating the mode of operation of the tape of FIG. 5 in conjunction with a support tool in accordance with the alternate embodiment of the invention.

FIG. 5 illustrates a roll 100 of pliable hollow thin-walled guide tubing having a free open end 110A.

As illustrated in FIG. 6, a strip 110 of pliable tubing is cut from roll 100. Strip 110 comprises hollow sleeve 111. Tubing sleeve 111 can, but preferably is not, be elastic. Sleeve 111 includes a pair of free open ends 110A. Consequently, although sleeve 111 is formed from a pliable polymer or other pliable material, sleeve 111 ordinarily will not stretch like a rubber band, or if sleeve 111 does stretch, it will do so only minimally. FIG. 6 also illustrates a support tool 55 comprised of a strip or rod fabricated from plastic or metal or other material. Tool 55 is substantially rigid but is also pliable in the manner, for example, of a flat thin orthogonal ruler fabricated from a thin strip of stainless steel. The stainless steel ruler can be pliably arcuately bent about a horizontal axis that is perpendicular to the longitudinal axis of the ruler; the ruler is not, however, permanently deformed and can be pliably bent back to an orientation in which the ruler lies flat on the flat surface of a table. Further, the stainless steel ruler is generally not pliable and bendable about its longitudinal axis. The ruler typically can not be arcuately bent about its longitudinal axis without permanently deforming the ruler. The pliability of tool 55 permits it to conform to a certain extent to a person's body while still providing support for sleeve 111. It is possible for tool 55 to be fabricated such that it pliable about its longitudinal axis, particularly as the ruler becomes wider, but such is not a presently preferred embodiment of the invention.

Tool 55 is slidably inserted in pliable sleeve 111 to support and generally maintain the elongate configuration of tubing sleeve 111 while sleeve 111 is mounted on padding 121 that extends around the arm or other body portion of an individual.

Figure 7:
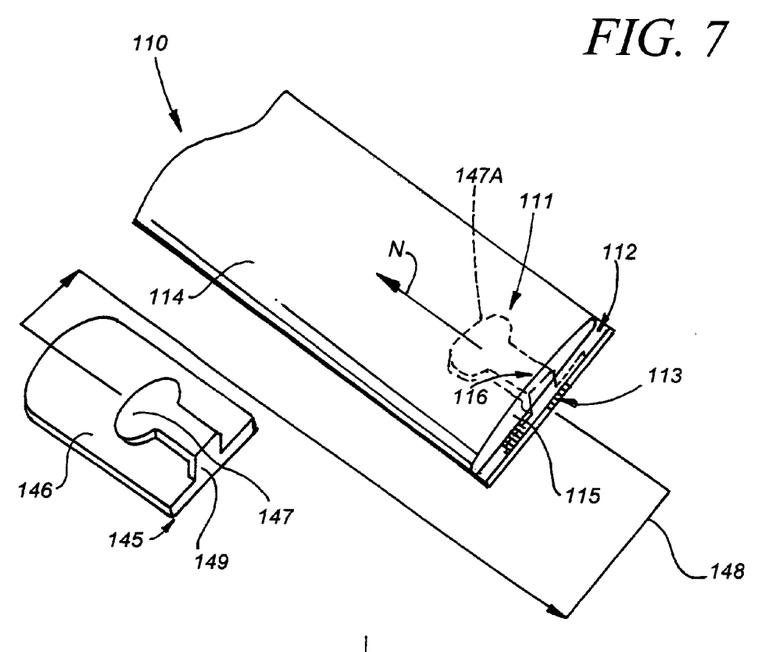
FIG. 7 is an enlarged perspective view further illustrating a section of the tape of FIG. 5.

The strip 110 is further depicted in FIG. 7 and illustrates the top 114 and bottom 115 of hollow elongate polymer sleeve 111. Foam strip 112 is glued or otherwise adhered to the exterior of bottom 115. A layer 113 of contact adhesive is formed on the bottom of foam strip 112 and is covered by a protective peelable removable strip (not shown) of wax paper or other material. This peelable strip is removed from adhesive layer 113 prior to applying sleeve 111 to the padding 121 on the arm (or leg or other body portion) 120 of a patient.

Figure 8:
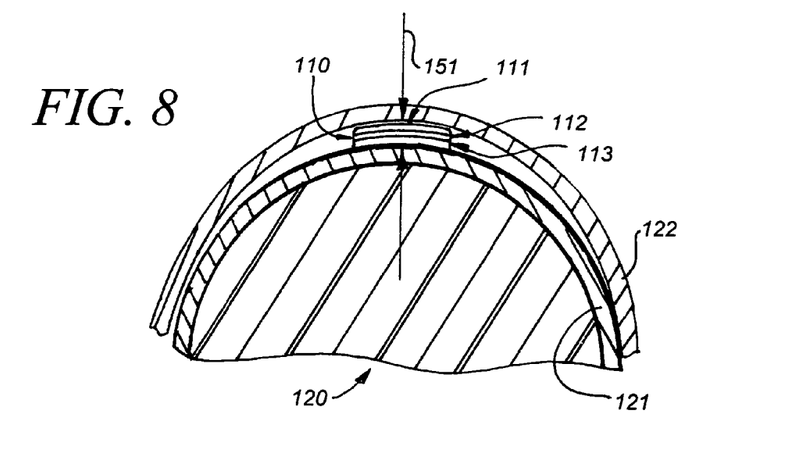
FIG. 8 is a perspective view further illustrating the mode of operation of the tape of FIG. 5.
Figure 9:
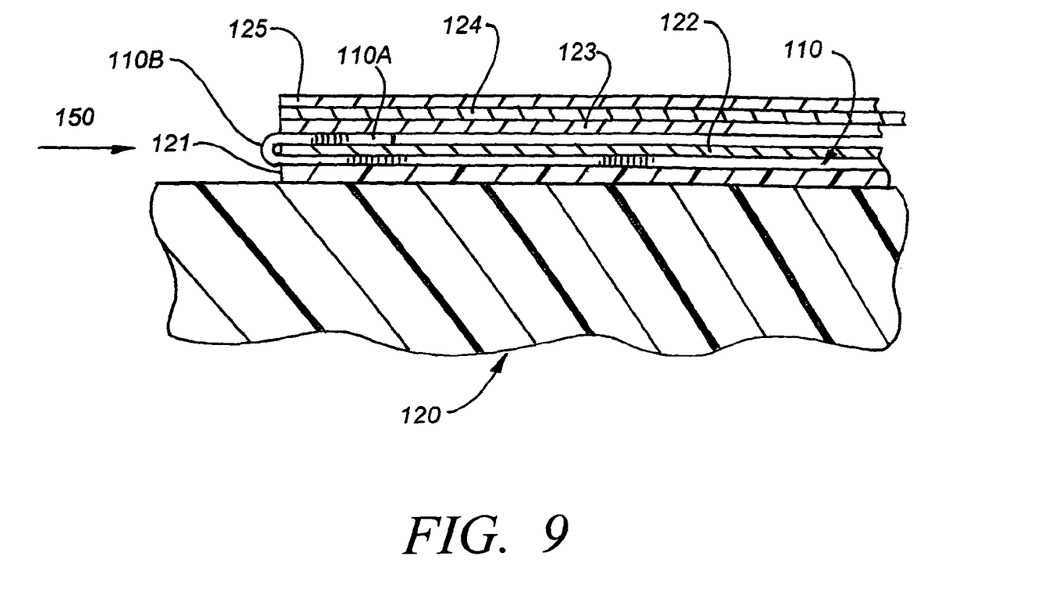
FIG. 9 is a side section view illustrating the mode of operation of the tape of FIG. 5.

FIGS. 8 and 9 illustrate the mounting of pliable substantially non-elastic strip 110 during the application of a cast to the arm 120 of an individual. After a physician has, if necessary, appropriately aligned and "set" a broken bone, padding 121 is wrapped around arm 120. Antiseptic can, if desired, be applied to the surface of arm 120 prior to applying padding 121. A sleeve 111 of appropriate length is cut. The length of sleeve 111 is, as will be apparent below, greater than the length of the cast that is to be applied. Tool 55 is slidably inserted in sleeve 111. Tool 55 preferably, but not necessarily, extends along the entire length of sleeve 111.

The protective peelable backing covering the layer 113 of contact adhesive is removed, and sleeve 111 is mounted on padding 121 such that contact adhesive layer 113 adheres to padding 121. The use of force to press sleeve 111 against padding 121 is minimized to minimize discomfort to the patient. Each of the free ends 110A of sleeve 111 extends outwardly beyond the ends of padding 121. Once sleeve 110 is in place on padding 121, tool 55 can, if desired, be slidably removed from sleeve 111.

The first layer 122 of fiberglass is wrapped around and over padding 121 and sleeve 111. Tool 55 must then, if not already removed from sleeve 111, be slidably removed from sleeve 111. The free ends 110A of sleeve 111 are wrapped up and over the first layer 122 of fiberglass and a second layer 123 of fiberglass is wrapped over and around the first layer 122 of fiberglass. The second layer 123 extends over free ends 110A and fixes them in place in the manner illustrated in FIG. 17. As a result, an elbow 110B or bend is formed at each end of sleeve 111. When the time comes to remove the cast, elbow 110B is cut to form an open end in sleeve 111 so that the foot 136 (FIG. 9) of the cutting tool can be inserted in the open end of and slide along sleeve 111. Additional layers 124 and 125 of fiberglass are applied and extend over and around fiberglass layer 123. The fiberglass layers 122 to 125 are permitted to harden to complete the application of the cast.

In an alternate embodiment of the invention, padding 121 extends a distance along arm 120 that is generally equivalent to the length of sleeve 111; however, the fiberglass layers extend a distance along arm 120 that is less than the distance which padding 121 (and sleeve 111) extends. Since the distance along arm 120 that the fiberglass extends is less than the distance along the arm 120 that sleeve 111 extends, this still permits the free ends 110A of sleeve 111 to be wrapped up and over fiberglass layer 122 in the manner illustrated in FIG. 9.

In a further embodiment of the invention, the free ends of sleeve 111 are not wrapped up and over the first layer of fiberglass in the manner describe above. Instead, after fiberglass layer 122 is applied, the free ends are cut off so that the ends of sleeve 111 generally co-terminate with the ends of the layer 122. Each end of sleeve 111 is sealed using the closure 145 illustrated in FIG. 7. The tombstone-shaped foot 146 of each closure 145 is inserted in an end of sleeve 111 in the manner indicated by arrow 148 in FIG. 1. Clip 147 extends upwardly and then over the top of layer 122 in the manner suggested in FIG. 7. Layer 122 is not depicted in FIG. 7, but clip 147 would, however, extend over the top of layer in the same manner it extends over the top 114 of sleeve 111 in FIG. 7. The subsequent layer of fiberglass 123 extends over and secures clip 147 (and insert 145) in place. When the time arrives to remove the cast, arm 149 is cut and foot 146 is pulled out from the end of sleeve 111 so that foot tracking foot 136 can be inserted in sleeve 111 in the manner described below.

Once the fiberglass cast has been worn a time sufficient for the bone to heal, or in the event there is another reason to remove the cast, the cast is removed.

First, scissors or another cutting tool is used to cut through the loop 110B at each end of the cast. This produces an opening at each end of the portion of sleeve 111 that extends intermediate padding 121 and fiberglass layer 122.

Figure 14:
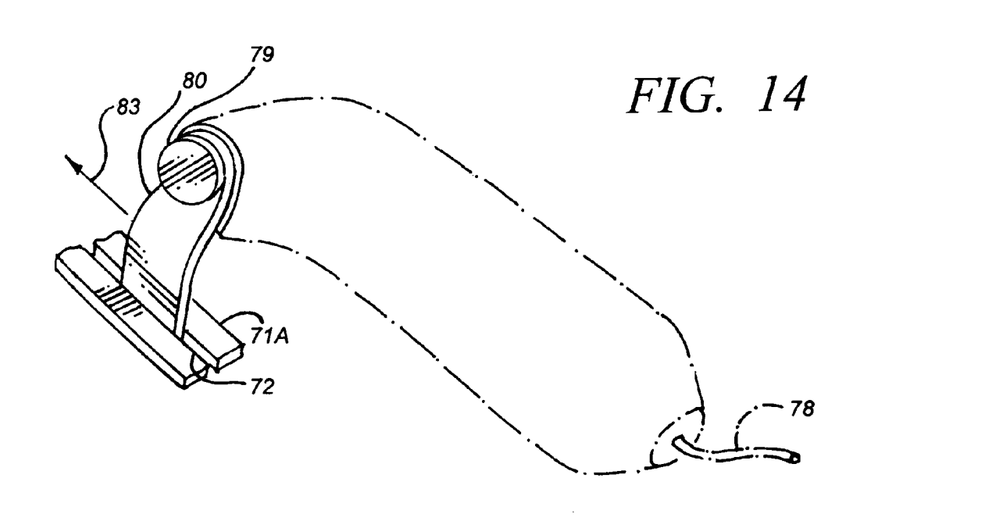

Second, the oscillating tool of FIG. 14 is utilized to cut through the cast.

Motive power to operate the motor in the tool of FIG. 14 can be supplied by a battery mounted in the tool housing 77, by electricity flowing through an electrical cable 78, etc.

After loop 110B is cut, the tool of FIG. 14 is manually grasped in the orientation pictured in FIG. 14 and blade 80 moves along the slot formed in the top of track 10 in the direction of arrow 83 to cut through the cast.

As would be appreciated by those of skill in the art, FIG. 9 illustrates the insertion of a first sleeve 111 on one side of arm 120. Ordinarily another second sleeve 111 is similarly inserted on the opposite side of arm 120 (or of a leg or other part of the body) and is parallel to the first sleeve 111 so that when the time comes to remove the cast, the cast is cut apart along two opposing sides of the cast.

Sleeve 111 must, in accordance with the invention, have several important properties.

First, the sleeve 111 must be pliable and bend in the same manner that a strip of conventional flat Christmas ribbon is pliable and bends—this in order to permit the sleeve 111 to generally conform to a patient's body.

Second, the sleeve must not be elastic and readily deform. In this sense, sleeve 111 is again similar to a piece of conventional elongate flat Christmas ribbon because such ribbon normally is not—even though it readily bends around the corners of a Christmas package—elastic; the ribbon does not readily stretch longitudinally or transversely.

Third, when the sleeve 111 is fabricated from a polymer, the polymer must have a strength sufficient to minimize the likelihood that end 74 (FIG. 12) or tool 55 can puncture the sleeve. It is preferred that the polymer have a width of at least 2 mils, preferably 3 mils, and most preferably at least 4 mils.

Fourth, it is important that sleeve 111 not lose its physical properties when heat is generated in the cast while the fiberglass cures. Consequently, the sleeve must not soften, melt, or become elastic in the event the sleeve is heated up to a maximum temperature of 130 degrees F., more preferably in the event the sleeve is heated up to a maximum temperature of 140 degrees F., and most preferably in the event the sleeve is heated up to a maximum temperature of 150 degrees F. A fiberglass cast can generate heat while it cures and hardens. It is believed that the temperature in the cast can, depending on conditions, exceed fifty degrees centigrade while the cast cures.

Fifth, the sleeve 111 must permit the lower leg 75 of guide 70 to slide freely along the sleeve when guide 70 and the tool of FIG. 14 are used to remove a cast. To this end, sleeve 111 can, if desired, be fabricated from a polymer, metal, or other material that includes an interior surface having a low coefficient of friction so that leg 75 readily freely slides along the interior of sleeve 111. Or, the interior of sleeve 111 can be coated with a material like Teflon™ that has a low coefficient of friction. Forming the interior surface of sleeve 111 from a "sticky" polymer which tends to adhere to leg 75 or foot 21 or tool 55 normally is not acceptable. Leg 75 preferably does not stick or adhere to the material comprising strip 111.

Sixth, the overall thickness, indicated by arrows 151 in FIG. 8, of strip 110 when top 114 is flat against bottom 115 is important. If the strip is too thick, the fiberglass layers can squeeze strip 110 and produce pressure which is uncomfortable to a patient, especially in the long term. The thickness 151 is no more than one-fourth of an inch, preferably no more than one-eighth of an inch, and more preferably no more than 3/32 of an inch, and most preferably no more than 1/16 of an inch. This thickness 151 includes sleeve 111, foam layer 112, and the adhesive layers. It does not include the protective removable backing strip that covers the adhesive layer 113. In an alternate embodiment of the invention, a foam layer 112 is not utilized and is not secured to sleeve 111.

Figure 11:
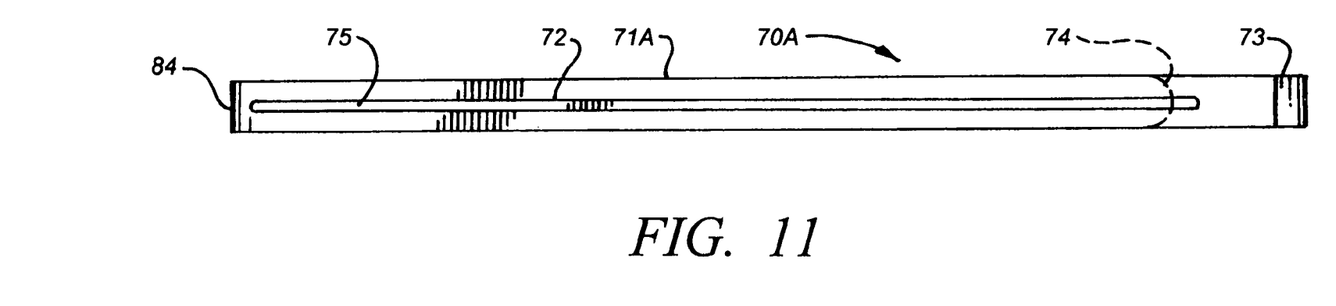
FIG. 11 is a top view illustrating a guide utilized in the practice of the invention.
Figure 12:
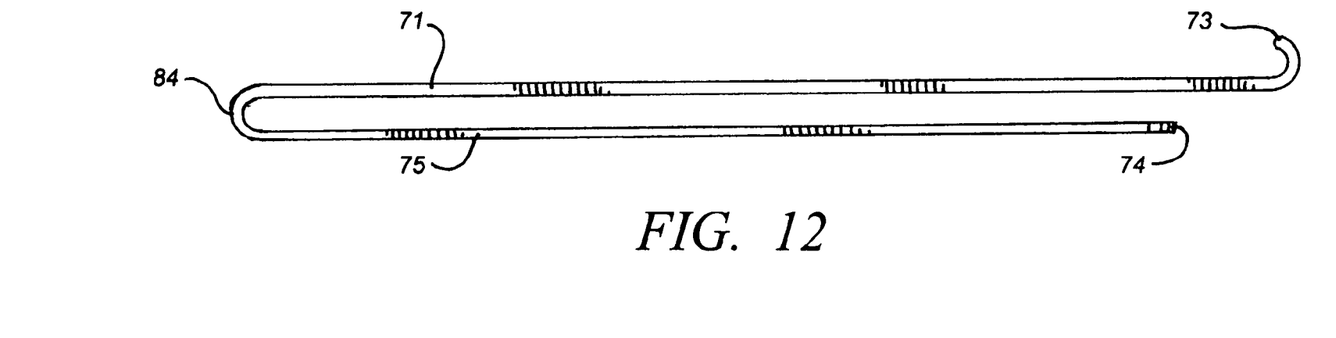
FIG. 12 is a side view illustrating the guide of FIG. 11.

FIGS. 11 and 12 illustrate a guide 70 utilized in an alternate embodiment of the invention. Guide 70 includes a pair of spaced apart parallel legs 71 and 75 interconnected by arcuate end 84. Upper leg 71 includes a guide slot 72 extending along at least a portion of the longitudinal axis of leg 71. Lower leg 75 generally has the same shape and dimension as upper leg 71, but lower leg 75 comprises a solid generally orthogonal member which does not have a slot cut through lower leg 35. Consequently, in the top view of FIG. 11 a portion of leg 75 is visible through (and beneath) slot 72.

Handle 73 is connected to one end of upper leg 71. Lower leg 75 includes a rounded end 74 spaced apart from and beneath handle 73 of upper leg 71.

Figure 13:
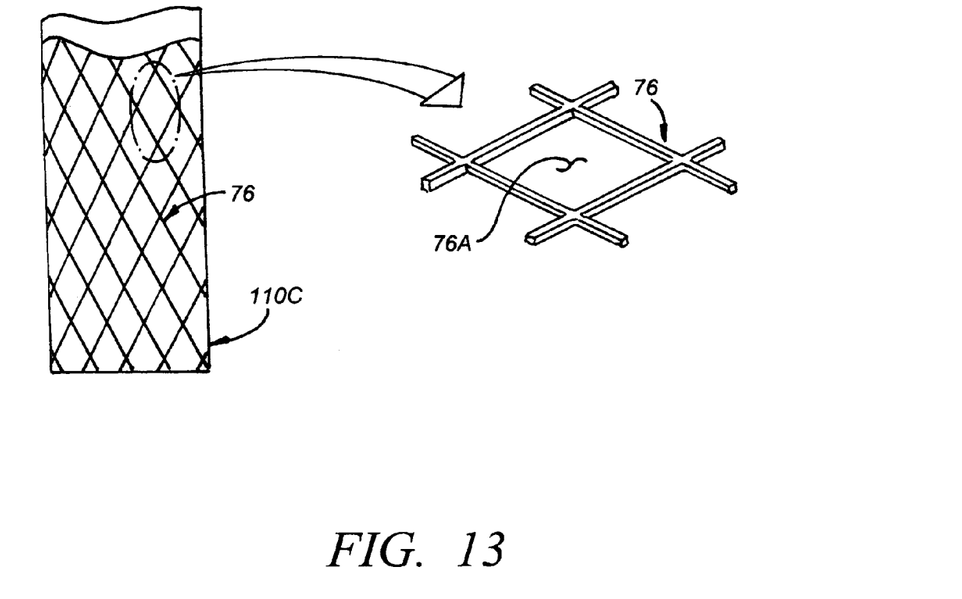
FIG. 13 is a top view illustrating an alternate embodiment of the tape utilized in the practice of the invention; and, FIG. 14 is a perspective view illustrating the mode of operation of an alternate embodiment of the invention.

In one embodiment of the invention, a hollow strip 110C includes a mesh 76 (FIG. 13) on its upper surface. The mesh 76 functions to interlock with fiberglass which is wrapped around the arm or other portion of an individual's body on which a cast is being applied. When fiberglass is initially wrapped around an individual's arm and over mesh 76, the fiberglass is "wet" and pliable and tend to drape, or flow, into openings 76A so that when the fiberglass hardens, the mesh 76 is interlocked with fiberglass which extends into openings 76A. The interlocking of mesh 76 and fiberglass is important because it functions to help maintain strip 110C in fixed position, which is, as will be described below, important when a guide 70 is utilized to remove a cast. In an alternate embodiment of the invention, a strip 110, 110C does not include mesh 76; however, strip 110, 1100 is preferably fabricated of a material (or some other material which is coated on or adhered to the top of strip 110, 110C) which adheres to fiberglass which is wrapped around and over strip 110, 110C and which, when the fiberglass hardens, functions in tandem with the fiberglass to maintain strip 110, 110C substantially in fixed position with respect to the fiberglass.

Mesh 76 comprises a woven, knit, knotted, or otherwise formed material having a weblike pattern of generally open texture with openings 76A that can be, but are not necessarily, evenly spaced.

FIG. 14 illustrates an oscillating tool including a housing 77, connector 79, blade or attachment 80, and electrical cord for delivering electricity to a motor (not visible) mounted in housing 77. The motor functions to oscillate and move attachment 80 through a narrow arc, typically about a three degree arc, at speeds typically in the range of 3,000 to 25,000 opm (oscillations per minute). Connector 79 removably secures attachment 80 on housing 77. The shape and dimension of attachment 80 can vary as desired. One or more of the peripheral edges of attachment 80 typically includes a plurality of small cutting teeth.

Figure 10:
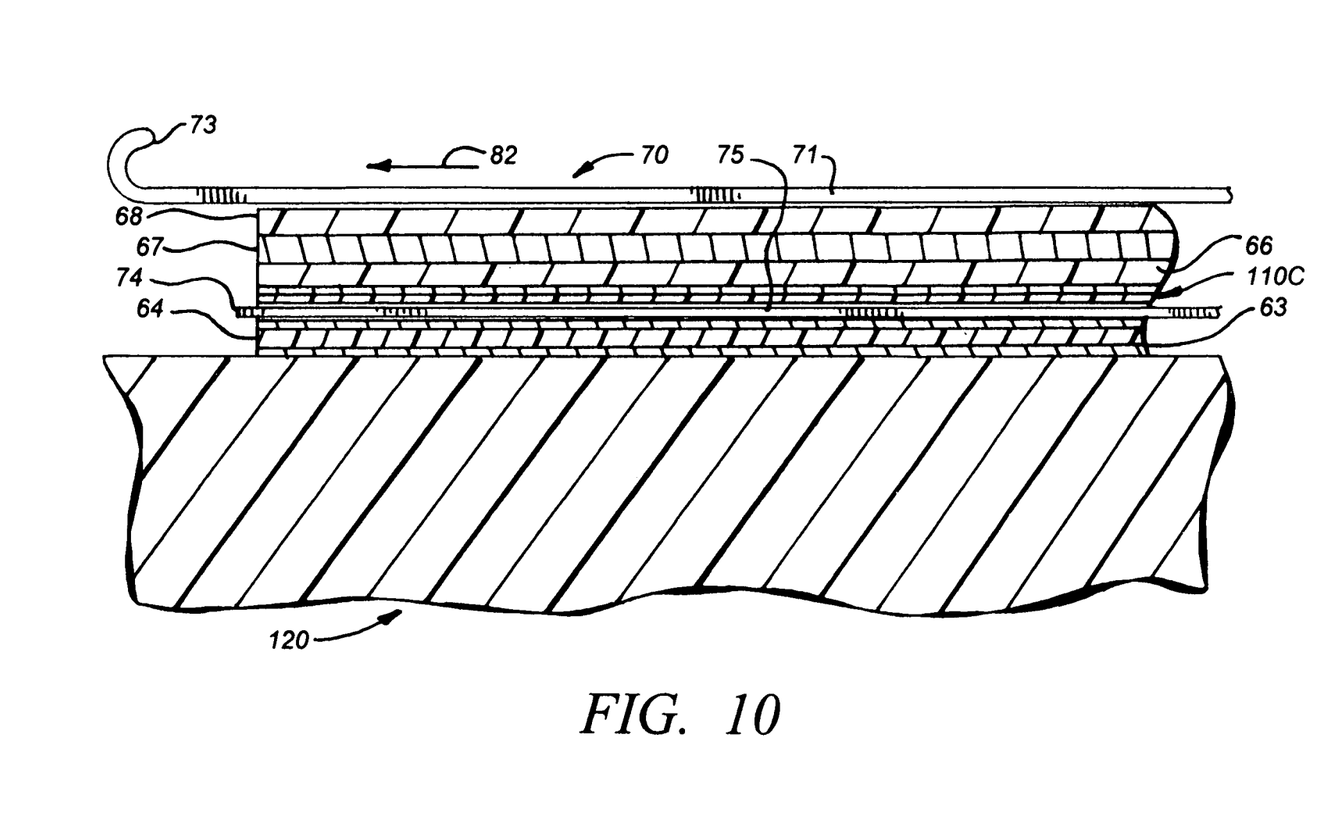
FIG. 10 is a side section view illustrating the mode of operation of another embodiment of the invention.

FIG. 10 illustrates an alternate embodiment of the invention in which pliable substantially non-elastic hollow strip 110C is incorporated during the application of a cast to the arm 120 of an individual. After a physician has, if necessary, appropriately aligned and "set" a broken bone, a thin elastic nylon sleeve 63 is mounted on and circumscribes arm 120, after which cotton or other fabric padding 64 is wrapped around arm 120. Antiseptic can, if desired, be applied to the surface of arm 120 prior to applying sleeve 63 and padding 64. A strip 110C of appropriate length is cut. The length of strip 110C is generally equal to or longer than the length of the cast that is to be applied. Strip 110C includes a layer of contact adhesive on the exterior bottom surface of the hollow polymer sleeve (which sleeve is comparable to sleeve 111 in strip 110), which sleeve comprises the center portion of strip 110C; and, includes a strip of wax paper or other material which extends along and covers the contact adhesive and which can be peeled off the contact adhesive to expose the adhesive. Strip 110C also includes a layer of mesh 65 fixedly glued or otherwise adhered to the exterior top surface of the hollow polymer sleeve which comprises the center portion of strip 110C.

Tool 55 is manually grasped and slidably inserted in the polymer sleeve of strip 110C. When tool 55 is full inserted in the polymer sleeve, tool 55 preferably, but not necessarily, extends along the entire length of the sleeve and extends out at least one end of the polymer sleeve. The portion of tool 55 which extends out one end of the polymer sleeve facilitates removing tool 55 from the sleeve.

The protective peelable backing covering the layer of contact adhesive on the bottom of the hollow polymer sleeve is removed, and strip 110C is mounted on padding 64 such that the contact adhesive layer (not visible in FIG. 10) adheres to padding 64. The use of force to press strip 110C against padding 64 is minimized to minimize discomfort to the patient. Each of the open ends of the hollow polymer sleeve in strip 110C generally co-terminates with the ends of padding 64, although the open ends can, if desired extend outwardly past the end of padding 64 on arm 120, or, can be located within or inset from the points at which padding 64 terminates. Once strip 110C is in place on padding 64, the portion of tool 55 which extends out one end can, if desired, be manually grasped and tool 55 can be slidably removed from strip 110C. Alternatively, tool 55 is left in strip 110C until the layers of fiberglass have been wrapped around arm 120 and strip 110C, after which tool 55 is removed from strip 110C.

The first layer 66 of fiberglass is wrapped around and over padding 64 and strip 110C. A portion of the first fiberglass layer 66 extending over the top of the hollow polymer sleeve interlocks with openings 76A in the mesh layer 65 which extends along the exterior of the top of the polymer sleeve in strip 110O. When layer 66 hardens it, along with the contact adhesive between the bottom of the hollow polymer sleeve and padding 64, generally fixedly secures and fixes strip 110C in position between layer 66 and padding 64. Such fixation of strip 110C is important because it reduces the likelihood that leg 75 will, when inserted in the polymer sleeve of strip 110C, tear or bind with the polymer sleeve. In the event the top of the hollow polymer sleeve is not provided with mesh layer 65, then the top of the hollow polymer sleeve preferably is made from a material(s) which will adhere to fiberglass such that when fiberglass is wrapped about strip 110C and harden, the top of the hollow polymer sleeve adheres to the hardened fiberglass to secure strip 110C in fixed position against the fiberglass.

A second layer 67 of fiberglass is wrapped over and around the first layer 66 of fiberglass. One or more additional layers 68 of fiberglass are applied and extend over and around fiberglass layer 67. The fiberglass layers 66 to 68 are permitted to harden to complete the application of the cast. A plug 145 or other filler is placed in each end of the hollow polymer sleeve and is securely taped in position. Any other desired method can be used to close the ends of the hollow polymer sleeve.

Once the fiberglass cast has been worn a time sufficient for the bone to heal, or in the event there is another reason to remove the cast, the cast is removed.

First, at least one end of the hollow polymer sleeve is opened by removing the plug 145 in the end of the sleeve.

Second, handle 73 of guide 70 is grasped and tool 70 is manually manipulated to insert end 74 of lower leg 75 of guide tool 70 in the open end of the hollow polymer sleeve and to push leg 75 through and along substantially the entire length of the hollow polymer sleeve (and thereof of the strip 110C) in the direction of arrow 82 (FIG. 10). After leg 75 is pushed into the hollow polymer sleeve, the guide 70 is positioned as depicted in FIG. 10 with the upper leg 71 of guide 70 extending along the outer surface of the cast and lower leg 75 extending through strip 110C.

Third, the oscillating tool of FIG. 14 is utilized to cut through the cast. Namely, housing 77 is manually grasped, and blade 80 is used (while the tool is being powered with electricity) to track along guide slot 72 and cut through the cast in the manner illustrated in FIG. 14. While blade 80 cuts through the cast and tracks along slot 72, the distal or outer end of blade 80 tracks along or near lower leg 75. Lower leg 75 prevents blade 80 from cutting through padding 64 and sleeve 63 and contacting a patient's epithelial tissue.

Having set forth our invention in terms to enable those skilled in the art to understand and practice the invention and having set forth the presently preferred embodiments and uses thereof, We claim:

1. A method of installing a fiberglass cast on and cutting the cast for removal from an individual, comprising the steps of:
   (a) providing a length of a pliable hollow thin-walled guide tube (110) with
      (i) a top,
      (ii) a bottom,
      (iii) a length,
      (iv) open first and second ends;
   (b) providing an elongate support tool (55) shaped and dimensioned to slide into and extend along said tube (110);
   (c) providing a cutting tool including
      (i) a housing (77),
      (ii) a motor unit mounted in said housing,
      (iii) a blade (80) oscillated by said motor unit;
   (d) providing a guide (70) including
      (i) an upper leg (71) with a guide slot (72) formed therealong, and
      (ii) a lower leg (75) spaced apart from said upper leg, said lower leg (75) shaped and dimensioned to fit in and slide along said pliable guide tube;
   (e) sliding said support tool in said pliable guide tube;
   (f) placing said guide tube and support tube on an individual;
   (g) applying at least first layer of fiberglass over a portion of said guide tube said guide tube;
   (h) applying at least a second layer of fiberglass along and over said first layer of fiberglass;

(i) sliding said support tool out of said guide tube;
(j) allowing said first and second layers of fiberglass to harden;
(k) at a subsequent time,
- (i) inserting said lower leg of said guide (70) in said tube with said upper leg of said guide extending over said cast, and
- (ii) using said blade (80) of said cutting tool to track along said guide slot (72) and cut through said first and second layers of fiberglass.

* * * * *